United States Patent Office 3,598,868
Patented Aug. 10, 1971

3,598,868
1-(PHENYLSULFONYL)CYCLOPROPANE-
CARBOXYLIC ACIDS
Donald J. Cram, Los Angeles, Calif., and Aleksander
Ratajczak, Lodz, Poland, assignors to The Regents of
the University of California, Berkeley, Calif.
No Drawing. Filed Mar. 12, 1968, Ser. No. 712,381
Int. Cl. C07c *147/06*
U.S. Cl. 260—515
14 Claims

ABSTRACT OF THE DISCLOSURE

The invention is a new group of compounds:

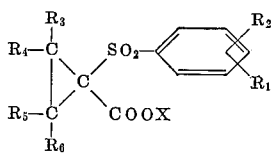

wherein X is hydrogen or a non-toxic cation, and wherein $R_1$, $R_2$, $R_3$, $R_4$, $R_5$, and $R_6$ are hydrogen or alkyl. These compounds are useful as chelating agents, resolving agents, intermediates to produce insecticides, and as non-caloric sweeteners.

DESCRIPTION OF THE INVENTION

This invention relates to novel compositions of matter. In particular, this invention relates to novel compounds of the formula:

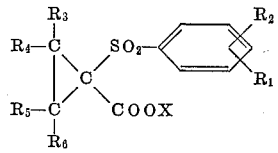

wherein X is hydrogen or a non-toxic cation, and wherein $R_1$, $R_2$, $R_3$, $R_4$, $R_5$, and $R_6$ are hydrogen or alkyl of 1 to 4 carbon atoms, inclusive.

In Formula I, $R_1$, $R_2$, $R_3$, $R_4$, $R_5$, and $R_6$ can all be hydrogen or all alkyl, or any combination thereof. When more than one R is alkyl, those alkyls can be alike or different, or any combination thereof.

Examples of alkyl of 1 to 4 carbon atoms, inclusive, are methyl, ethyl, propyl, butyl, and isomeric forms thereof.

The novel 1-(phenylsulfonyl)cyclopropanecarboxylic acids of Formula I, and the salts thereof, are useful for various purposes. For example, these novel compounds form coordination complexes with a wide variety of metal ions. Therefore, they are useful as chelating agents to remove metal ions from aqueous solutions or other environments, or to control or maintain metal ions at predetermined concentrations.

The novel Formula I compounds have at least one asymmetric carbon atom and, as described below, the racemic acids produced by the process described below can be resolved into the corresponding separate dextrorotatory and levorotatory acids. Those optically active acids are useful as resolving agents to separate the enantiomers of asymmetric organic bases.

The novel Formula I acids can be esterified in accordance with U.S. Pat. 2,220,521 to form beta-thiocyanoethyl esters useful for the purposes, especially as insecticides, described in that patent.

The novel Formula I compounds have an apparently unique effect on animal taste buds. These novel compounds, especially the non-toxic salts because of their increased water solubility, are at least as sweet to the human taste as saccharin and N-cyclohexylsulfamate (cyclamate) salts. But the sweetness response of human taste buds to these novel compounds is somewhat delayed, while the response to saccharin and cyclamate is immediate. For example, addition of a cyclamate salt and/or a saccharin salt to a mixture of lemon juice and water results in a mixture which is at once sweet to the taste. Addition of a Formula I compound, for example, the compound wherein $R_3$ and $R_4$ are methyl, $R_1$, $R_2$, $R_5$, and $R_6$ are hydrogen, and X is sodium ion, to a mixture of lemon juice and water results in a mixture which is at first and momentarily pleasantly sour to the taste, but which soon causes a desirably strong and relatively long lasting sweet taste in the mouth.

Because of this unexpected biological property, the novel Formula I compounds of this invention, especially the non-toxic salts, are useful wherever a non-toxic non-caloric sweetening agent is desired, for example, all of the various uses of sweetening agents, mentioned in U.S. Pat. 3,087,821, as well as related animal growth and veterinary uses, for example, to make animal and bird feeds more palatable or oral veterinary medicines more easily administered. These novel compounds are especially useful to sweeten foods and beverages since they do not initially mask the other flavors.

It is well known that saccharin and cyclamate solutions often leave an unpleasant after-taste in the mouth. Solutions of the novel compounds of this invention do not have that disadvantage. Indeed, as mentioned above, the sweet taste of these novel compounds lingers long after the initial contact with the taste buds. For this reason, combinations fo these novel compounds with saccharin and/or cyclamate are especially useful as non-toxic non-caloric sweetening agents in place of or in combination with saccharin, cyclamate, or combinations of those. These novel combinations are especially useful when both initial sweetness and long lasting sweetness are desired. These novel combinations advantageously contain about 5 to about 95% by weight of the Formula I compound or non-toxic salt thereof with about 95 to about 5% by weight of saccharin or of cyclamate, or with about 95 to about 5% by weight of any of the useful mixtures of saccharin and cyclamate known to the art.

When a non-toxic salt of the novel Formula I compound is to be used as a sweetener, i.e., when X in Formula I is a non-toxic cation, it is preferred that the cation be sodium or calcium. However, non-toxic cations corresponding to other alkali and alkaline earth metals can also be used for this purpose. Also, ammonium and non-toxic substituted ammonium, e.g., dimethylammonium, ethanolammonium, and diethanolammonium can also be used.

The novel Formula I compounds of this invention wherein X is hydrogen are prepared by metallation and then carbonation of the corresponding unsubstituted or alkyl-substituted cyclopropyl phenyl sulfone of the formula:

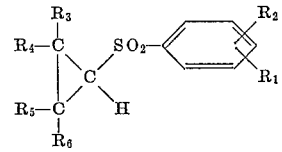

wherein $R_1$, $R_2$, $R_3$, $R_4$, $R_5$, and $R_6$ are as defined above. These Formula II cyclopropyl phenyl sulfone intermediates are either known in the art or can be prepared by methods known in the art. See, for example, Zimmerman et al., J. Am. Chem. Soc. 82, 2505 (1960); Truce et al., J. Org. Chem. 26, 1463 (1961); Van Leusen et al., Rec. Trav. Chim. 84, 151 (1965) and 86, 225 (1967); and Ratajczak et al., J. Am. Chem. Soc. 89, 2072 (1967).

The metallation of the Formula II reactant is advantageously carried out by mixing the reactant with an alkyllithium, e.g., butyllithium, in the presence of an inert liquid diluent, e.g., diethyl ether, hexane, or mixtures of those.

The carbonation of the resulting organic lithium compound is advantageously carried out by mixing said lithium compound with a large excess of solid carbon dioxide. Excess carbon dioxide and diluent are then removed by sublimation and evaporation, and the residue is acidified. There is usually no need to isolate and purify the organic lithium compound before carbonation, and the total reaction mixture containing said lithium compound is advantageously mixed with crushed solid carbon dioxide substantially free of water.

Non-toxic salts of Formula I 1-(phenylsulfonyl)cyclopropanecarboxylic acids are prepared by methods known in the art for preparing salts of known carboxylic acids. For example, the alkali metal salts are advantageously prepared by adding an aqueous solution of a stoichiometric amount of a hydroxide, carbonate, or bicarbonate corresponding to the inorganic salt desired to an aqueous suspension or an aqueous-organic solvent solution of the Formula I acid. Evaporation of the water, and organic solvent if one is used, then gives the alkali metal salt in solid form if that is desired. The calcium and magnesium salts are similarly prepared with the use of a solution of the calcium or magnesium base, e.g., the hydroxide. To produce an ammonia or amine salt, the Formula I acid is advantageously dissolved in a suitable solvent of either moderate or low polarity. Examples of the former are ethanol, acetone, and ethyl acetate. Examples of the latter are diethyl ether and benzene. At least a stoichiometric amount of ammonia or of the amine corresponding to the desired cation is then added to that solution. If the resulting salt does not precipitate, it can be obtained in solid form by addition of a miscible diluent of low polarity or by evaporation. If the amine is relatively volatile, any excess can easily be removed by evaporation. It is preferred to use stoichiometric amounts of less volatile amines.

The racemic Formula I 1-(phenylsulfonyl)cyclopropanecarboxylic acids obtained as described above are resolved by preparing a mixture of diastereoisomeric salts by reaction with an optically active base, e.g., quinine and brucine. That mixture of salts is separated by fractional crystallization from a suitable solvent or combination of solvents. The separated diastereoisomeric salts are then each converted by acidification back to the separate optically active Formula I 1-(phenylsulfonyl)cyclopropanecarboxylic acids. Each of the latter is then converted, if desired, to a non-toxic salt as described above for the racemic acid.

The invention can be more fully understood by the following examples:

EXAMPLE 1

Racemic 2,2-dimethyl-1-(phenylsulfonyl)cyclopropanecarboxylic acid

A solution of 2,2-dimethylcyclopropyl phenyl sulfone (72 g.) in 800 ml. of dry diethyl ether in a nitrogen atmosphere protected from external moisture was cooled externally to 5° C. A solution of butyllithium in hexane (170 ml. of 1.6 molar solution) was added with stirring during 10 minutes. The mixture temperature rose to 15° C. during the addition. After an additional 10 minutes of stirring with external ice bath cooling, the milky-yellow reaction mixture was added to about 500 g. of crushed solid carbon dioxide substantially free of condensed moisture. The resulting mixture was stirred and then poured into a shallow dish open to air. After the excess solid carbon dioxide sublimed and the solvent evaporated, the white residue was dissolved in warm water. The solution was filtered, concentrated, and acidified with sulfuric acid. The oil which formed was separated, and the aqueous layer was extracted four times with diethyl ether. The diethyl ether extracts were combined and added to the oil. The resulting solution was dried with anhydrous sodium sulfate and then evaporated to an oil. The oil was dissolved in benzene. The white crystals which soon separated were filtered and dried; weight 43.0 g. An additional 6.8 g. of white crystalline solid was obtained after concentrating the benzene filtrate. These two solids were combined and refluxed with 500 ml. of benzene, and the solution was filtered to remove insoluble solid. Cooling the benzene solution and filtration of the solid which crystallized gave 39.7 g. of racemic 2,2 - dimethy - 1 - (phenylsulfonyl)cyclopropanecarboxylic acid in the form of white crystals; M.P. 84–85° C.

Calcd. for $C_{12}H_{14}O_4S$ (percent): C, 56.67; H, 5.57. Found (percent): C, 56.75; H, 5.58.

Following the procedure of Example 1 but using in place of 2,2-dimethylcyclopropyl phenyl sulfone:

cyclopropyl phenyl sulfone
cyclopropyl p-tolyl sulfone
cyclopropyl p-tert-butylphenyl sulfone
cyclopropyl m-ethylphenyl sulfone
cyclopropyl 2,4-xylyl sulfone
2-methylcyclopropyl phenyl sulfone
2,3-dimethylcyclopropyl phenyl sulfone
2,2-diethylcyclopropyl phenyl sulfone
2,2-dibutylcyclopropyl phenyl sulfone
2,2,3-trimethylcyclopropyl phenyl sulfone
2,2,3,3-tetramethylcyclopropyl phenyl sulfone
2,2-dimethylcyclopropyl p-tolyl sulfone there are obtained respectively the corresponding racemic 1-(phenylsulfonyl)cyclopropanecarboxylic acids.

EXAMPLE 2

Dextrorotatory 2,2-dimethyl-1-(phenylsulfonyl)-cyclopropanecarboxylic acid

Racemic 2,2-dimethyl-1-(phenylsulfonyl)cyclopropanecarboxylic acid (50.9 g.) and quinine (64.9 g.) were dissolved in 2500 ml. of warm absolute ethanol. The solution was allowed to cool slowly during 48 hours to 30° C. The resulting mixture was filtered to give 60.75 g. of white crystalline quinine salt (A) and a filtrate (B).

Salt (A) (59.75 g.) was dissolved in 3000 ml. of warm absolute ethanol, and the solution was allowed to cool to 30° C. during 48 hours. Filtration gave 36.05 g. of white crystalline quinine salt (C).

Salt (C) (35.0 g.) was dissolved in 2000 ml. of warm absolute ethanol, and the solution was allowed to cool to 30° C. during 48 hours. Filtration gave 27.0 g. of white crystalline quinine salt (D).

A solution of potassium hydroxide (5 g.) in 25 ml. of water was added to a suspension of salt (D) (19.4 g.) in 80 ml. of ethanol. About one liter of water was added to the resulting solution. After filtration of the quinine which precipitated, the filtrate was concentrated under reduced pressure to about 110 ml. The solution was cooled, filtered, extracted three times with chloroform, extracted twice with diethyl ether, and then saturated with sodium chloride. The saturated solution was acidified with 50% aqueous sulfuric acid. The resulting mixture of oil and aqueous layer was extracted six times with diethyl ether. The diethyl ether extracts were combined, dried with anhydrous sodium sulfate, and then evaporated under reduced pressure to give an oil. The oil crystallized to a pale yellow solid on scratching; weight 7.6 g. Additional solid was obtained in the same manner from the remainder of salt (D); total weight 11.2 g. (E).

Solid (E) was dissolved in 125 ml. of benzene, and the solution was allowed to stand for 48 hours. Filtration gave a filtrate which was evaporated under reduced pressure to give 8.6 g. of dextrorotatory 2,2-dimethyl-1-(phenylsulfonyl)cyclopropanecarboxylic acid in the form of white crystals; M.P. 102–103° C., $[\alpha]_{546}^{25}+20.15°$ (c. 5, chloroform) (F). The $[\alpha]_{546}^{25}$ of acid (F) was raised to $+20.65°$ by converting acid (F) again to a solution of quinine salt (1.27 g. acid (F) and 1.62 g. of quinine dissolved in 180 ml. of ethanol), allowing that solution to stand at 25° C. for 24 hours, collecting the 2.45 g. of quinine salt which separated in the form of white needles (G), recrystallizing salt (G) from 180 ml. of ethanol to give 2.18 g. of quinine salt (H), and converting quinine salt (H) back to the free 2,2-dimethyl-1-(phenylsulfonyl) cyclopropanecarboxylic acid.

EXAMPLE 3

Levorotatory 2,2-dimethyl-1-(phenylsulfonyl)cyclopropanecarboxylic acid

Filtrate (B) from Example 2 was concentrated under reduced pressure to 1000 ml., and then was allowed to remain at 25° C. for 24 hours. The solid which precipitated was removed by filtration, and the filtrate was evaporated to give 19.4 g. of a white solid quinine salt (I).

Solid quinine salt (I) was converted to 7.6 g. of the corresponding free acid (J) as described in Example 2 for solid (D).

Free acid (J) was dissolved in benzene, and the solution was retained at 25° C. for 24 hours. The solid which precipitated was removed by filtration, and the filtrate was concentrated to a small volume. Addition of pentane then caused separation of a crystalline solid which was filtered to give 4.4 g. of levorotatory 2,2-dimethyl-1-(phenylsulfonyl)cyclopropanecarboxylic acid; M.P. 100–102° C., $[\alpha]_{546}^{25}$ —18.20° (c. 5, chloroform).

Following the procedures of Examples 2 and 3, each of the racemic 1 - (phenylsulfonyl)cyclopropanecarboxylic acids mentioned above after Example 1 was resolved into the corresponding dextrorotatory and levorotatory forms.

EXAMPLE 4

Racemic sodium 2,2-dimethyl-1-(phenylsulfonyl)cyclopropanecarboxylate

Racemic 2,2-dimethyl-1-(phenylsulfonyl)cyclopropanecarboxylic acid (1.0 g.) was dissolved in 20 ml. of water-ethanol (1:1). The solution was neutralized with an equivalent amount of 0.1 N aqueous sodium bicarbonate solution. Evaporation to dryness gave racemic sodium 2,2-dimethyl-1-(phenylsulfonyl)cyclopropane carboxylate.

Following the procedure of Example 4, the dextrorotatory and levorotatory forms of 2,2-dimethyl-1-(phenylsulfonyl)cyclopropanecarboxylic acid were each converted to the corresponding sodium salts. Also following the procedure of Example 4, each of the other above-mentioned racemic, dextrorotatory, and levorotatory 1-(phenylsulfonyl)cyclopropanecarboxylic acids was converted to the corresponding sodium salt.

Also following the procedure of Example 4 but using potassium bicarbonate, calcium hydroxide, and diethanolamine in place of the sodium bicarbonate, there were obtained the corresponding racemic, dextrorotatory, and levorotatory potassium, calcium, and diethanolammonium salts of each of the above-mentioned 1-(phenylsulfonyl) cyclopropanecarboxylic acids, including 2,2-dimethyl-1-(phenylsulfonyl)cyclopropanecarboxylic acid.

EXAMPLE 5

Racemic ammonium 2,2-dimethyl-1-(phenylsulfonyl)-cyclopropanecarboxylate

A stream of dry ammonia gas was bubbled through a solution of 2,2-dimethyl-1-(phenylsulfonyl)cyclopropane-carboxylic acid in diethyl ether. The white precipitate which formed was recovered by filtration to give ammonium 2,2 - dimethyl - 1-(phenylsulfonyl)cyclopropanecarboxylate.

Following the procedure of Example 5, the ammonium salts of dextrorotatory and levorotatory 2,2-dimethyl-1-(phenylsulfonyl)-cyclopropanecarboxylic acid and of each of the other above-mentioned racemic, dextrorotatory, and levorotatory 1-(phenylsulfonyl)cyclopropanecarboxylic acids was prepared.

We claim:
1. A compound of the formula:

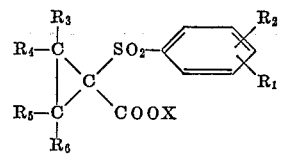

wherein X is hydrogen, a non-toxic alkali metal cation, a non-toxic alkaline earth metal cation, ammonium ion, or a non-toxic substituted ammonium ion, and wherein $R_1$, $R_2$, $R_3$, $R_4$, $R_5$, and $R_6$ are hydrogen or alkyl of 1 to 4 carbon atoms, inclusive.

2. The racemic form of a compound according to claim 1.

3. The dextrorotatory form of a compound according to claim 1.

4. The levorotatory form of a compound according to claim 1.

5. A compound according to claim 1 wherein $R_1$, $R_2$, $R_5$, and $R_6$ are hydrogen, and $R_3$ and $R_4$ are alkyl of 1 to 4 carbon atoms, inclusive.

6. A compound according to claim 5 wherein $R_3$ and $R_4$ are methyl.

7. 2,2 - dimethyl - 1-(phenylsulfonyl)cyclopropanecarboxylic acid.

8. The racemic form of a compound according to claim 7.

9. The dextrorotatory form of a compound according to claim 7.

10. The levorotatory form of a compound according to claim 7.

11. The sodium or calcium salts of 2,2-dimethyl-1-(phenylsulfonyl)cyclopropanecarboxylic acid.

12. The racemic form of a compound according to claim 11.

13. The dextrorotatory form of a compound according to claim 11.

14. The levorotatory form of a compound according to claim 11.

References Cited

Cram et al, Jour. Amer. Chem. Soc., vol. 90(8), 1968, pp. 2198–2200.

JAMES A. PATTEN, Primary Examiner

U.S. Cl. X.R.

252—182; 260—284, 287, 454, 501.15, 607

UNITED STATES PATENT OFFICE
CERTIFICATE OF CORRECTION

Patent No. 3,598,868   Dated August 10, 1971

Inventor(s) Donald J. Cram and Aleksander Ratajczak

It is certified that error appears in the above-identified patent and that said Letters Patent are hereby corrected as shown below:

Column 1, line 28, read -- The invention described herein was made in the course of, or under, a grant from the U.S. Public Health Service, Department of Health, Education, and Welfare. --.
Column 2, line 30, for "fo these" read -- of these --.

Signed and sealed this 6th day of June 1972.

(SEAL)
Attest:

EDWARD M. FLETCHER, JR.
Attesting Officer

ROBERT GOTTSCHALK
Commissioner of Patents